United States Patent [19]
Hugonin

[11] 3,791,564
[45] Feb. 12, 1974

[54] APPARATUS FOR CENTRALIZING HORIZONTALLY-MOVING PIPE SECTIONS

[75] Inventor: Gerald H. Hugonin, Cypress, Tex.

[73] Assignee: Schlumberger Technology Corporation, New York, N.Y.

[22] Filed: Aug. 17, 1972

[21] Appl. No.: 281,364

[52] U.S. Cl..................... 226/19, 226/176, 226/186
[51] Int. Cl............................................. B65g 35/00
[58] Field of Search..... 226/15, 18, 19, 34, 35, 176, 226/177, 186, 184

[56] References Cited
UNITED STATES PATENTS

| | | | |
|---|---|---|---|
| 3,510,042 | 5/1970 | Romere | 226/177 |
| 3,527,126 | 9/1970 | Jones | 226/176 X |
| 3,658,222 | 4/1972 | Dressel | 226/176 X |

Primary Examiner—Richard A. Schacher
Attorney, Agent, or Firm—Ernest R. Archambeau, Jr. et al.

[57] ABSTRACT

As a preferred embodiment of the present invention disclosed herein for centralizing elongated members, such as joints of oil-field tubing or pipe and the like, being transported by a conveyor along a selected horizontal axis, an opposed pair of intercoupled centralizing rollers are spaced on opposite sides of the axis and cooperatively arranged to normally remain immediately adjacent to the surfaces of a pipe joint being transported by the conveyor. Upon passage of an enlarged portion or bent section of the pipe between the two rollers, control means are provided for selectively separating the rollers in unison as well as imposing selectively-increased opposing forces on the rollers as necessary for retaining the pipe in alignment with the axis.

12 Claims, 5 Drawing Figures

3,791,564

APPARATUS FOR CENTRALIZING HORIZONTALLY-MOVING PIPE SECTIONS

As pointed out in the Tompkins Pat. No. 3,287,632, it is fairly common to magnetically inspect elongated ferromagnetic tubular members such as joints of drill pipe and oil-field tubing for flaws and defects that may affect their utility. To perform these inspections in any efficient manner, a pipe that is to be inspected is first subjected to a longitudinally-oriented magnetic field so that generally-transverse flaws in the pipe may be located by means of suitable flux-responsive measuring devices. Then, in many instances, the pipe is subjected to a circumferentially-oriented magnetic field for detecting generally-longitudinal flaws that may exist in the pipe.

To conduct these inspections, generally-horizontal conveyors with a series of horizontal pipe-engaging rollers are customarily employed to axially transport the joints of pipe to be inspected back and forth through the inspection apparatus. One typical arrangement employs rollers respectively shaped as a pair of opposed truncated cones having reduced intermediate portions that simply support the pipe joints and depend solely upon the weight of the pipes to retain them approximately centered on the conveyor. With this arrangement, however, the pipes cannot always be reliably maintained in accurate alignment with the several sections of the inspection apparatus. The problem becomes even more aggravated either when a bent pipe joint or a pipe joint having an enlarged-diameter end portion is passing through the inspection apparatus.

Accordingly, it is an object of the present invention to provide new and improved apparatus for selectively centralizing elongated pipe joints being transported along a selected horizontal axis without hindering their travel even when these members have enlarged portions or bent sections.

This and other objects of the present invention are attained by arranging an opposed pair of centralizing members adjacent to opposite exterior portions of an elongated pipe or tubing joint being transported along a selected horizontal axis, with these centralizing members being cooperatively arranged for movement in unison away and toward the elongated member. To assure positive alignment of the pipe member, control means are provided for urging the opposed centralizing members against the transported member to selectively impose laterally-directed forces thereon as required to maintain the elongated member in alignment with the axis.

The novel features of the present invention are set forth with particularity in the appended claims. The invention, together with further objects and advantages thereof, may be best understood by way of the following description of exemplary apparatus employing the principles of the present invention as illustrated in the accompanying drawings, in which:

FIG. 1 schematically illustrates apparatus in accordance with the present invention arranged for cooperation with typical pipe-inspection apparatus;

Figure 1:
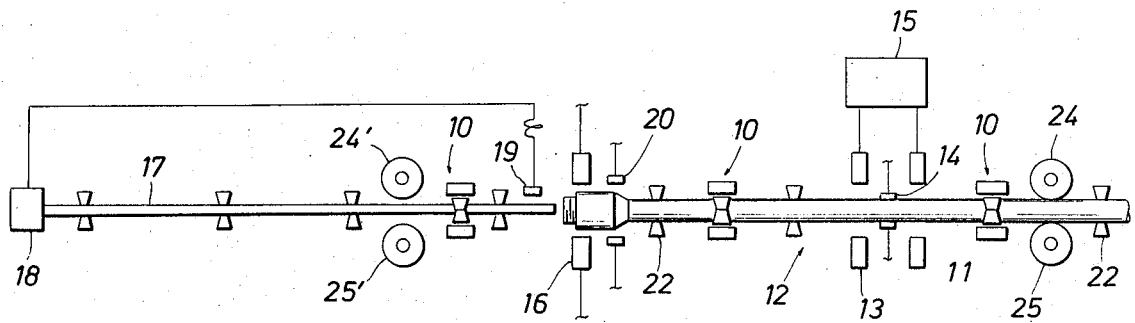

To illustrate one manner in which the present invention can be employed, FIG. 1 depicts three similar or identical pipe centralizers 10 each arranged in accordance with the present invention and respectively disposed as they might be employed for selectively centralizing elongated members, such as joints of oil-field tubing or pipe 11 or other tubular members, as they are being transported through flaw-inspection apparatus 12 such as that disclosed in the aforementioned Tompkins patent. Reference should be made, of course, to the Tompkins patent for elaboration of any details of the pipe-inspection apparatus 12 and the particulars of its operation. Thus, the forthcoming description is intended to briefly show in general the arrangement of the pipe-inspection apparatus 12 and a typical inspection operation therewith only so far as is necessary to bring out the full significance of the present invention.

In general, the inspection apparatus 12 is arranged to progressively induce a longitudinally-oriented magnetic flux in a horizontal joint of tubing or pipe, as at 11, being advanced axially in a first direction through the inspection apparatus so that transversely-oriented flaws in the pipe can be concurrently detected. Any residual mangetism remaining in the pipe 11 is at least partially reduced by progressively subjecting the advancing pipe to a demagnetizing flux after it has been inspected for transversely-oriented flaws. When generally longitudinally-oriented flaws are also to be detected, the pipe 11 is halted and then subjected to a circumferentially-oriented magnetic field. Thereafter, as this pipe 11 is returned in the opposite direction through the inspection apparatus 12, it is progressively inspected for longitudinally-oriented flaws. On the other hand, when no inspection is to be made for such longitudinally-oriented flaws, the pipe 11 is merely withdrawn from the inspection apparatus 12 so that other pipes can be inspected.

To perform these inspections, the pipe-inspection apparatus 12 includes an annular coil 13 for progressively inducing a longitudinally-oriented magnetic flux in pipes moving through the coil. As pointed out in the Tompkins patent, it is preferred to divide the flux-inducing coil 13 into two longitudinally-spaced sections and arrange a plurality of flux-detecting heads 14 therebetween. In this manner, when the coil 13 is energized by a power source 15, the resulting longitudinally-oriented flux induced in a pipe moving therethrough will have a significant longitudinal dimension and the flux-detecting heads 14 will exhibit a greater sensitivity by being located at the approximate mid-point of this magnetic field. A second annular coil 16 is also appropriately arranged to the rear of the flux-inducing coil 13. An AC source (not shown) is connected to the coil 16 and suitably arranged to progressively subject a pipe leaving the coil 13 to an alternating magnetic field for at least reducing any longitudinally-oriented residual magnetism remaining therein. It will, of course, be appreciated that centralization of a pipe moving through the inspection apparatus 12 is important.

The pipe-inspection apparatus 12 further includes an electrically-conductive, cantilevered elongated probe or lance 17 that is supported at its remote end and maintained in substantially coincidental alignment with pipes passing through the apparatus. As is more fully described in the Tompkins patent, a pipe that is to be inspected for longitudinal flaws is advanced onto the lance 17 until the lance has passed completely through the central bore of the pipe and its free end projects out of the rearward end of the pipe. To subject a pipe receiving the lance 17 to a circumferentially-oriented magnetic field, a DC source 18 is connected between the remote supported end of the lance and one or more laterally-movable electrical contacts 19 that are selectively engageable with the free end of the lance. A plurality of flux-detecting heads 20 are arranged for movement into contact with and coaxial rotation about a pipe for detecting generally-longitudinal flaws therein as it is being withdrawn from over the lance 17. Hereagain, the importance of maintaining the pipes being inspected in coincidental alignment with the apparatus 12 is evident.

It will be appreciated, therefore, from this brief description that the centralizing apparatus 10 of the present invention must be capable of maintaining elongated members such as the pipe 11 in coincidental alignment as they are passed back and forth through the inspection unit 12. Moreover, the pipe-centralizing apparatus 10 must be capable of maintaining elongated sections of oil-field piping in a reasonable coincidental alignment even where these pipe joints have upset or enlarged end portions or where these pipe joints are not perfectly straight.

In its preferred form, the centralizing apparatus 10 of the present invention includes a conveyor 21 having a plurality of longitudinally-spaced transverse rollers 22 for contacting spaced portions of a pipe and adapted to movably support an elongated member such as the pipe 11 for axial movement along a selected inspection axis 23. In the preferred manner of selectively driving the pipe 11 along the conveyor 21, one or more opposed pairs of driving rollers 24 and 25 (as well as at 24° and 25') are adapted to contact circumferentially-spaced portions of the pipe and to be urged or biased thereagainst with sufficient force so that whenever these rollers are rotatably driven, the pipe will be propelled along the conveyor. Inasmuch as the idler rollers 22 on the conveyor 21 are appropriately arranged to movably support the pipe 11 at the proper elevation to be aligned with the axis 23, the rollers 24 and 25 are arranged to contact substantially diametrically-opposed side portions of the pipe so as to generally position it laterally in relation to the axis. Moreover, to better accommodate different sizes of pipes passing therebetween, the rollers 24 and 25 (as well as 24' and 25') are respectively adapted for generally-lateral or transverse movement in relation to the axis 23. The details of this pipe-translating conveyor 21 are fully described in U.S. Pat. No. 3,565,310.

Figure 3:
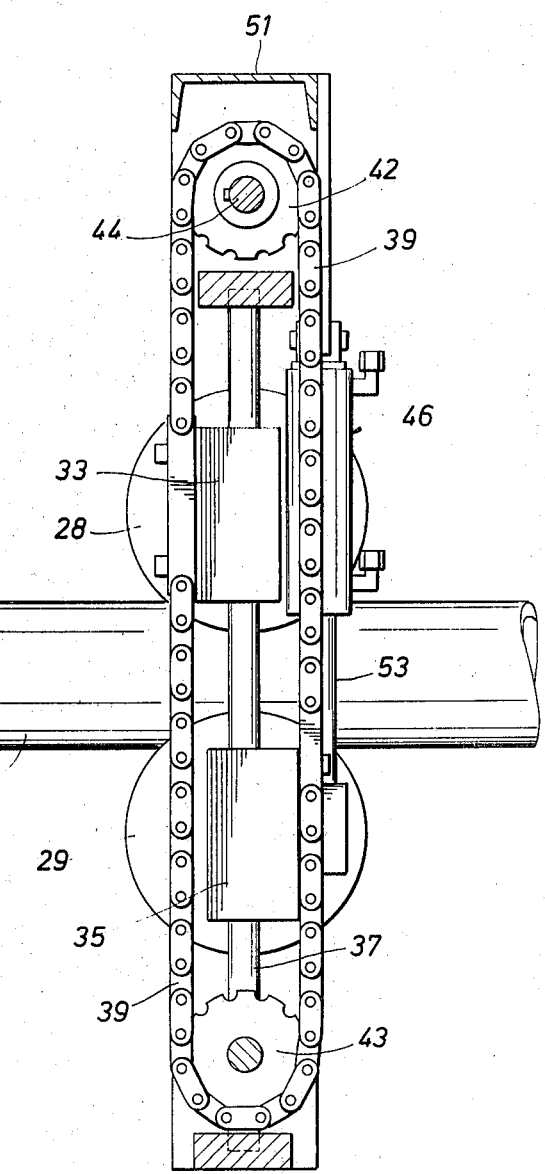
FIGS. 2 and 3 are elevational views of a preferred embodiment of the present invention.
Figure 2:
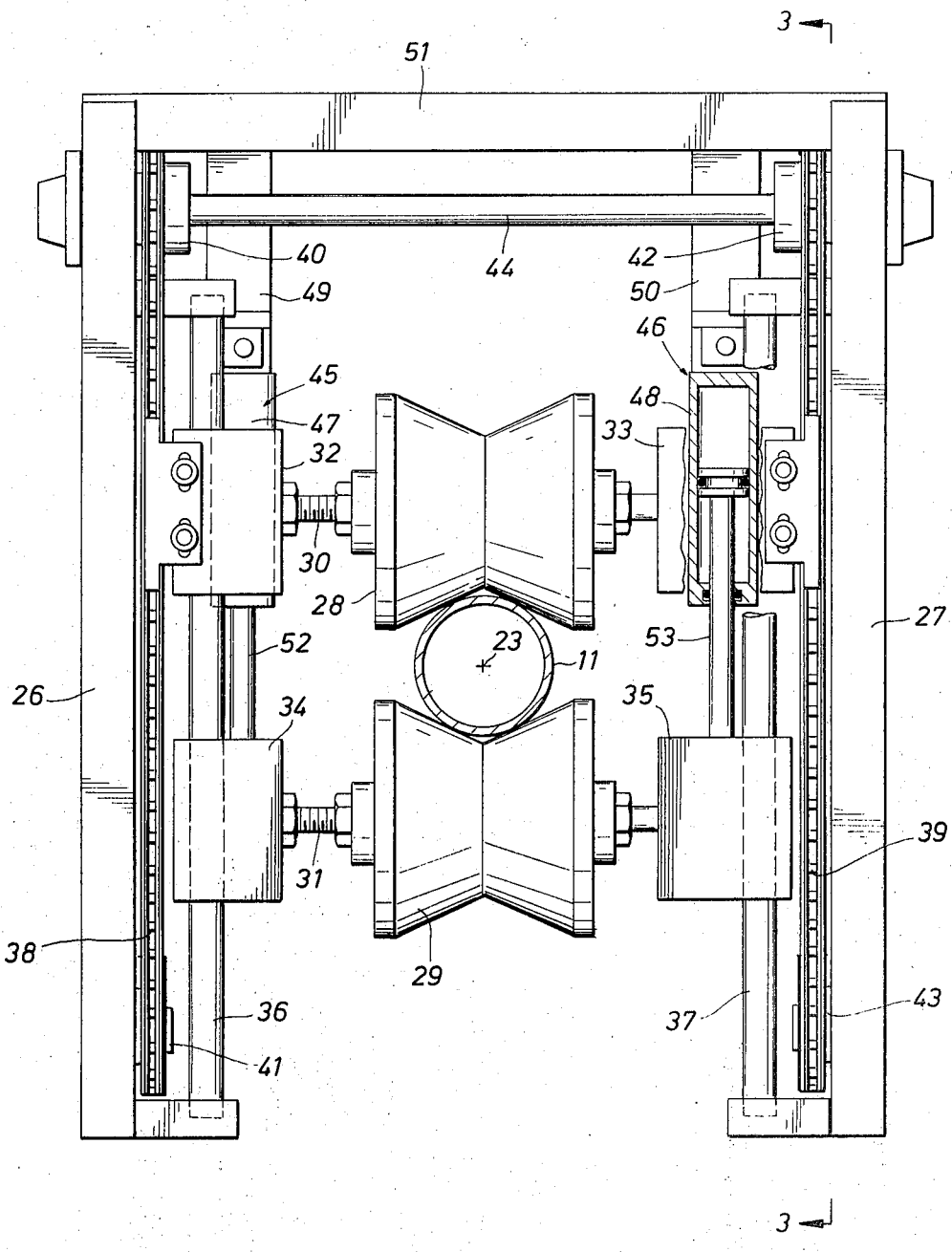

Turning now to FIGS. 2 and 3, front and side elevational views are shown of a preferred embodiment of one of the pipe-centralizer devices 10 of the present invention. As illustrated, the centralizer 10 includes a suitable frame having a pair of uprights 26 and 27 mounted on opposite sides of the longitudinal inspection axis 23 along which a pipe, as at 11, is being transported. The centralizer 10 further includes pipe-centralizing means such as an opposed pair of vertically-movable rollers 28 and 29 which are horizontally positioned and respectively have outwardly-diverging frusto-conical end portions cooperatively arranged to rollingly engage spaced upper and lower circumferential portions of the pipe 11 for maintaining the pipe coincidentally aligned with the inspection axis 23. To support the centralizing rollers 28 and 29 in a horizontal position above and below the pipe 11, the rollers are respectively journalled on axles 30 and 31 carried between support blocks 32–35, with these blocks individually being slidably coupled to upright guide rods 36 and 37 mounted on the upright supports 26 and 27 for independent vertical movement in relation to the pipe.

In the preferred embodiment of the present invention, the centralizing rollers 28 and 29 are cooperatively arranged to be selectively moved in opposite directions by respectively coupling the upper support blocks 32 and 33 to one side of endless roller chains 38 and 39 and the lower blocks 34 and 35 to the opposite side of the endless chains. In this manner, by cooperatively arranging the roller chain 38 on one set of chain sprockets 40 and 41 and the other chain 39 on another set of vertically-spaced sprockets 42 and 43 and intercoupling the upper sprockets by a common shaft 44, rotation of the common shaft in one direction will be effective for separating the centralizing rollers 28 and 29 and counter rotation of the shaft will bring the rollers together. In other words, since the upper support blocks 32 and 33 carrying the upper roller 28 are on one side of the roller chains 38 and 39 and the lower support blocks 34 and 35 carrying the lower roller 29 are on the other side of the chains, rotation of the chains in any given direction will always move the centralizing rollers in unison but in opposite directions.

To selectively move the centralizing rollers 28 and 29, actuating means are provided such as a pair of piston actuators 45 and 46 which are cooperatively coupled to the centralizing rollers. In the preferred embodiment of the present invention, the piston actuators 45 and 46 include piston cylinders 47 and 48 that are respectively coupled by bars 49 and 50 to a frame member 51 mounted between the uprights 26 and 27. The piston members 52 and 53 of the actuators 45 and 46 are respectively coupled to the lower support blocks 34 and 35. Accordingly, upon simultaneous extension of the piston members 52 and 53, the lower support blocks 34 and 35 will be moved downwardly together as the upper support blocks 32 and 33 are carried upwardly in unison by virtue of the cooperative arrangement of the roller chains 38 and 39 and their respective sprockets 40–43. Conversely, retraction of the pistons 52 and 53 in relation to the cylinders 47 and 48 will shift the lower support blocks 34 and 35 upwardly as the upper support blocks 32 and 33 are moved downwardly. It should be noted that the interconnecting shaft 44 between the sprockets 40 and 42 serves to synchronize the movements of the support blocks 32–35 should the piston actuators 45 and 46 not operate precisely alike.

It will be recognized, therefore, that by introducing a pressured fluid into the lower ends of the piston cylinders 47 and 48, the piston actuators 45 and 46 will urge the opposed rollers 28 and 29 inwardly against the pipe 11 on the conveyor 21 with lateral forces commensurate with the pressure of the pressured fluid. This alone would, of course, serve to simply apply centralizing forces on the pipe 11 once it has been transported between the rollers 28 and 29. However, it should be recognized that the rollers 28 and 29 must not be urged toward one another with such force that axial movement of a pipe along the conveyor 21 will be unduly impeded by the centralizing rollers. Moreover, it will be appreciated that there will be a needless expenditure of power if excessive centralizing forces are imposed by the rollers 28 and 29 and thereby require additional power consumption for transporting piping members through the several centralizing devices 10.

Accordingly, in keeping with the objects of the present invention, each of the new and improved centralizing apparatus 10 further includes control means 54 cooperatively arranged for positioning the centralizing rollers 28 and 29 so as to impose little or no restraint on the movement of piping members back and forth along the conveyor 21 so long as these pipe or tubing joints are coincidentally aligned with the inspection axis 23. As will also be subsequently explained, the control means 54 further cooperate to apply a selected centralizing force to a given piping joint should it become eccentrically diposed in relation to the inspection axis 23.

Figure 4:
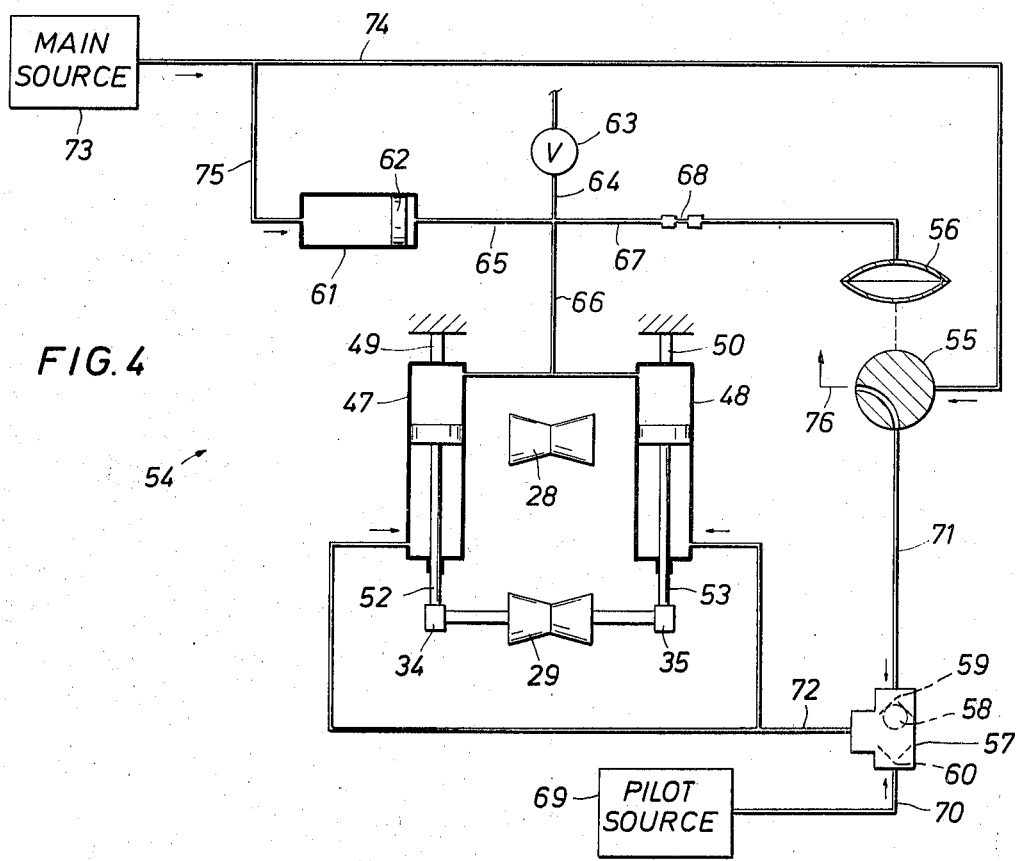
FIG. 4 is a schematic view of a preferred control system of the present invention.

Turning now to FIG. 4, a schematic view is depicted of the control means 54. As seen there, the control means 54 include a typical three-way valve 55 having a pressure-responsive actuator or pilot control 56, a so-called "shuttle" valve 57 having a movable valve member such as a ball 58 which is movable between an opposed pair of annular valve seats 59 and 60 in response to pressure differentials acting on the ball member, and a fluid-isolating cylinder 61 having a piston 62 cooperatively arranged therein. A source (not shown) of a suitable selectively-pressured hydraulic fluid such as oil or the like is coupled by way of a normally-closed blocking valve 63 to a hydraulic conduit 64 that is divided into separate branch conduits 65–67 respectively coupled to one side of the isolating cylinder 61, the upper ends of the actuating cylinders 47 and 48, and the pilot control 56. For reasons that will subsequently be explained, an orifice or some other suitable flow restrictor 68 is arranged in the branch conduit 67 to regulate the flow of hydraulic fluid between the main hydraulic conduit 64 and the pilot control 56.

Although a hydraulic fluid such as oil or the like could be used, in the preferred embodiment of the present invention, it is preferred that a low-pressure pneumatic source 69 of a suitably-regulated pressured gas such as air or the like is coupled by a pneumatic conduit 70 to one inlet of the shuttle valve 57 and the other inlet of the shuttle valve is connected by a pneumatic conduit 71 to the common port of the three-way valve 55. The outlet of the shuttle valve 57 is coupled by a pneumatic conduit 72 to the lower ends of the actuating cylinders 47 and 48. A high-pressure source 73 of pneumatic fluid is coupled by a conduit 74 to the normally-open inlet of the three-way valve 55 and by a pneumatic conduit 75 to the opposite side of the isolating cylinder 61. The normally-closed port of the three-way valve 55 is vented, as at 76, to the atmosphere.

From FIG. 4, it will be appreciated that the relative positions of the centralizing rollers 28 and 29 at any given time will be governed by the volume of hydraulic fluid which is then confined in the upper portions of the actuating cylinders 47 and 48. Thus, in the utilization of the new and improved centralizing apparatus 10 of the present invention, the centralizer rollers 28 and 29 can be selectively positioned in relation to one another by either admitting or discharging hydraulic fluid from the cylinders 47 and 48 as required to set the rollers in position to permit the passage of a pipe of a given size between the rollers. By selectively arranging the control means 54 as illustrated in FIG. 4, the control means may be regulated to maintain only a moderate centralizing force on the pipe, as at 11, so long as the pipe is coincidentally aligned with the inspection axis 23. Alternatively, the rollers 28 and 29 can be positioned as required to remain slightly apart from the pipe 11 so long as it remains in alignment with the inspection axis 23. This is the preferred manner of operation. Conversely, in either case, should the pipe 11 become eccentrically aligned in relation to the inspection axis 23 as where the pipe either is bent in relation to its longitudinal axis or is laterally displaced by some extrinsic force, the control means 54 will cooperatively respond to immediately apply an increased centralizing force to restore the pipe to its original aligned position. It will, of course, be recognized that if a pipe is badly bent, there can be a limit beyond which the bent portion cannot be fully centralized. This would be a function of the stiffness of the pipe joint.

To understand the operation of the control means 54, it should be initially noted that FIG. 4 schematically depicts the centralizing apparatus 10 as it will appear when a pipe 11 of a given diameter is centralized. To establish the correct positioning of the rollers 28 and 29, preliminary adjustments must, of course, be made of the control means 54 by adjusting the volume of hydraulic fluid in the hydraulic system. Although other procedures could be followed, one start-up procedure is to initially block communication between the high-pressure pneumatic source 73 and the inlet of the three-way valve 55 and temporarily open the blocking valve 63 for admitting hydraulic fluid into the hydraulic system. This will, of course, serve to shift the pistons 52 and 53 to their fully-extended positions as the upper portions of the cylinders 47 and 48 are filled. The piston 62 will also be shifted temporarily to the left-hand end (as viewed in FIG. 4) of the small cylinder 61 as the hydraulic fluid fills the system. At this point, the rollers 28 and 29 will be at their maximum upper and lower positions respectively.

A pipe of the same diameter as those that are to be inspected is then advanced along the conveyor 21 until the pipe is between the rollers 28 and 29. Once this occurs, air from the low-pressure source 69 is admitted by way of the conduit 70 to the cylinders 47 and 48 for repositioning the rollers 28 and 29 in touching contact with the pipe. As this takes place, hydraulic fluid will be displaced from the upper portions of the cylinders 47 and 48 and returned through the open valve 63 to the hydraulic supply.

The valve 63 is then closed so as to trap a volume of hydraulic fluid in the system sufficient to position the rollers 28 and 29 in touching contact with the pipe. The high-pressure source 73 is then admitted to the conduits 74 and 75. As this occurs, the piston 62 in the isolating cylinder 61 will be shifted to the right-hand end of the cylinder; and, thereby, displace a small commensurate volume of hydraulic fluid into the upper portions of the cylinders 47 and 48. Thus, the pistons 52 and 53 will be slightly extended to move the centralizing rollers 28 and 29 a short distance away from the wall of the pipe.

It should be appreciated, therefore, that the function of the isolating cylinder 61 and its piston 62 is to first allow the rollers 28 and 29 to be initially moved into touching engagement with a pipe of a given diameter. Then, as the piston 62 is shifted to the opposite end of the cylinder 61, this minor displacement of hydraulic fluid into the actuating cylinders 47 and 48 will move the centralizing rollers 28 and 29 slightly away from the pipe wall.

Once the system 10 is correctly set, it will be recognized that the pressure of the hydraulic fluid will be acting on the pilot 56 of the three-way valve 55 to shift the valve to its illustrated flow-blocking position. Since this operating position of the valve 55 blocks the port connected to the conduit 74 and vents the conduit 71, the pneumatic pilot source 69 will be communicated to the actuating cylinders 47 and 48 by way of the conduit 70, the shuttle valve 57 and the conduit 72. An inspection operation can now be commenced.

At this point, if, for example, an enlarged end-portion of the pipe 11 passes between the opposed rollers 28 and 29, the rollers will be temporarily separated; and the pressure of the hydraulic fluid in the cylinders 47 and 48 will be momentarily reduced by this temporary separation. The orifice 68 will prevent operation of the pilot 56 of the valve 55. Once the enlarged pipe portion clears the centralizing rollers 28 and 29, the pneumatic pressure in the conduit 72 will reposition the rollers as illustrated.

Figure 5:
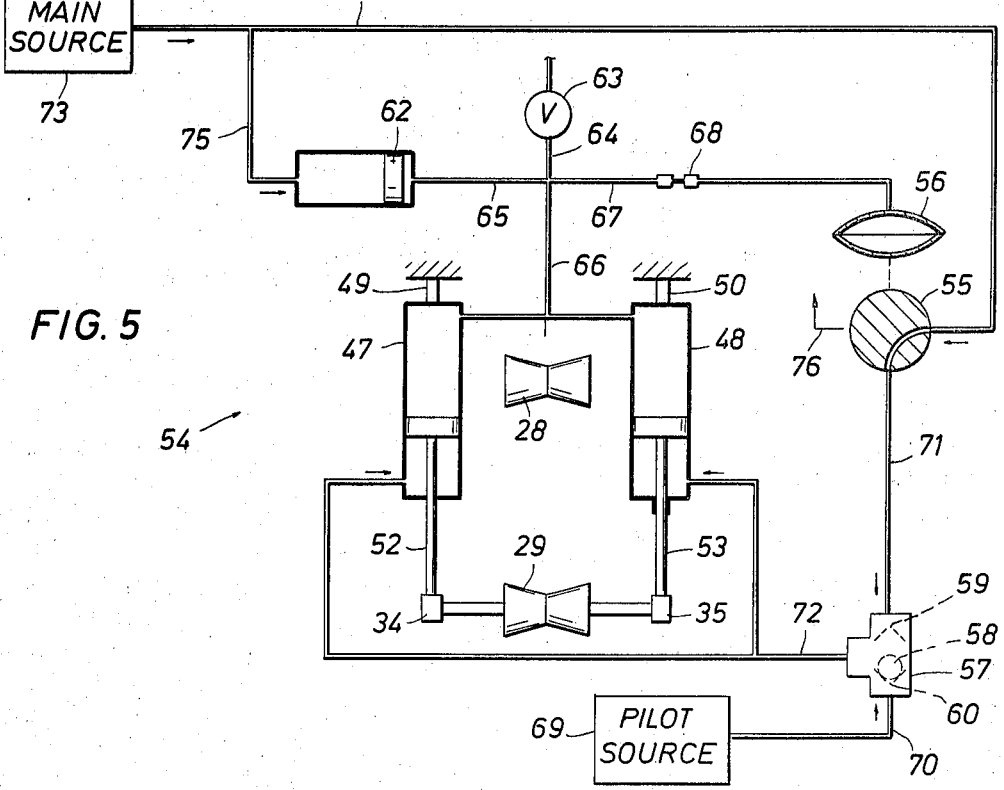
FIG. 5 depicts an alternative operating position of the apparatus illustrated in FIG. 4.

On the other hand, as seen in FIG. 5, should the pipe 11 be shifted to a significantly eccentric position, it will move one of the two rollers 28 and 29 and thereby (by virtue of the roller chains 38 and 39) carry the other roller to a corresponding more-distant position. As this occurs, the further separation of the opposed rollers 28 and 29 will shift the pistons 52 and 53 further downwardly in their respective cylinders 47 and 48. The resulting expansion of the upper spaces in the cylinders 47 and 48 will, therefore, again produce a corresponding reduction in the pressure of the hydraulic fluid. This pressure reduction will cause the pilot 56 to operate once the hydraulic fluid bleeds through the dampening orifice 68 and shift the valve 55 to its illustrated fluid-communicating position. Once this occurs, the higher-pressure main source 73 will be communicated with the shuttle valve 57 by way of the pneumatic conduits 71 and 74 to shift the ball 58 into engagement with the seat 60. The higher pneumatic pressure will, therefore, be admitted to the lower end of the cylinders 47 and 48 to impose a centralizing force of selected magnitude on the rollers 28 and 29.

It will be appreciated that only one of the two rollers 28 and 29 will be in contact with the pipe 11 when it is eccentric in relation to the inspection axis 23. Thus, once the increased centralizing force is applied against whichever wall of the pipe 11 is in contact with the roller 28 (or 29), the pipe will, of course, be urged laterally toward the inspection axis 23 with a force commensurate with the pneumatic pressure of the main source 73. If the pipe 11 is capable of being moved back into alignment with the inspection axis 23, the rollers 28 and 29 will again return to their normal position as shown in FIG. 4. Since there is a constant volume of hydraulic fluid in the hydraulic system, restoration of the pistons 52 and 53 to their normal positions will again apply an increased hydraulic pressure to the pilot 56 to return the valve 55 to its flow-blocking position depicted in FIG. 4. Once this occurs, the pilot source 69 will again be communicated with the actuator cylinders 47 and 48 and the rollers 28 and 29 will be returned to their initial positions which, as previously discussed, is preferably just out of touching contact with the pipe 11 so long as it is centralized in relation to the inspection axis 23.

Accordingly, it will be appreciated that by spacing a number of the new and improved centralizing devices 10 of the present invention at selected intervals along the length of the conveyor 21, as an elongated pipe joint, as at 11, is moved along the rollers 22 each of the several centralizers will function independently to retain the spaced portions of pipe accurately centralized in relation to the inspection axis 23. So long as the pipe 11 remains centered by virtue of the rollers 22, the several centralizers 10 will be inactive as illustrated in FIG. 4. However, should the entire length of the pipe 11 move laterally in any direction from the axis 23, the pipe will contact one of the centralizing rollers 28 and 29 in each centralizing apparatus 10 and operate the control valve 55 in each device to communicate the main pneumatic source 73 (which may, if desired, be a common supply of pressured gas or air) for realigning the pipe with the axis.

Similarly, should there be a bent section in the pipe 11, as this bent section progressively travels along the conveyor 21, one or more of the new and improved centralizing devices 10 will be operated to at least attempt to center that section of the pipe with the axis 23 for improving the inspection of the section. It will, of course, be recognized that all of the centralizers 10 can be operating simultaneously with, for example, the centrlalizers at the ends of the pipe 11 trying to push the ends in one direction and the centralizers at the mid-portion of the pipe trying to push it in the opposite direction. This operation will, however, result in the pipe 11 being forced in such directions and at such locations as to tend to straighten the pipe and move its entire length into alignment with the inspection axis 23. Those skilled in the art will, of course, recognize that with the smaller sizes of oil-field tubing, it is not at all unlikely that such tubing can be readily flexed so as to easily align it with the inspection axis 23. On the other hand, with the larger sizes and thicker styles of oil-field piping, it is quite possible that a badly-bent joint will be flexed only slightly so that this pipe joint simply cannot be fully centralized. In this situation, the new and improved centralizers 10 can function to maintain the pipe joint in alignment with the inspection axis 23 only as near as possible.

Accordingly, it will be appreciated that the centralizer apparatus of the present invention is uniquely arranged for maintaining horizontally-moving elongated pipe sections in alignment with a designated longitudinal axis. By arranging an opposed pair of centralizing members to normally be either in light contact with the pipe wall or immediately adjacent thereto when the pipe is centralized, movement of the pipe toward an eccentric position will be effective for actuating the control system of the new and improved centralizing system to push one of the centralizing members against the pipe wall in a direction and with a force tending to recenter the pipe. Once the pipe is again aligned with the designated axis, the centralizing members will again return to their initial position.

While only a particular embodiment of the present invention has been shown and described, it is apparent that changes and modifications may be made without departing from this invention in its broader aspects; and, therefore, the aim in the appended claims is to

I claim:

1. Apparatus adapted for maintaining an axially-moving pipe member in coincidental alignment with a selected horizontal axis and comprising:
   conveyor means arranged along said axis and adapted for normally supporting a pipe moving along said axis in coincidental alignment therewith;
   first and second pipe-centralizing members movably arranged on opposite sides of said axis and respectively adapted for movement between a normal position adjacent to said axis and an extended more-distant position;
   means cooperatively intercoupling said pipe-centralizing members and adapted to move said pipe-centralizing members in unison with one another;
   piston-actuating means coupled to at least one of said pipe-centralizing members and adapted for applying force thereon for returning said pipe-centralizing members respectively to their said normal positions; and
   control means coupled to said piston-actuating means for normally retaining said pipe-centralizing members in their said normal positions and operable only upon movement of said pipe-centralizing members toward their said extended positions in response to engagement of a laterally-shifting pipe on said conveyor means against one of said pipe-centralizing members for operating said piston-actuating means to urge said one pipe-centralizing member against the pipe with a uniform force of a predetermined magnitude to realign it with said axis as said pipe-centralizing members are respectively restored to their said normal positions.

2. The apparatus of claim 1 wherein said pipe-centralizing members are respectively comprised of an elongated roller having frusto-conical diverging end portions respectively adapted to engage circumferentially-spaced surfaces of a pipe moving along said conveyor means.

3. The apparatus of claim 2 wherein there are two of said rollers diametrically opposed to one another.

4. The apparatus of claim 1 wherein said intercoupling means include:
   at least one pair of sprocket wheels respectively journalled on opposite sides of said axis, at least one endless drive chain cooperatively arranged on said sprocket wheels for movement back and forth thereon, means cooperatively coupling said first pipe-centralizing member to one half of said drive chain for carrying said first pipe-centralizing member in the direction of movement of said one half of said drive chain, and means cooperatively coupling said second pipe-centralizing member to the other half of said drive chain for carrying said second pipe-centralizing member in the direction of movement of said other half of said drive chain.

5. Apparatus adapted for maintaining an axially-moving pipe member in coincidental alignment with a selected horizontal axis and comprising:
   conveyor means arranged along said axis and adapted for normally supporting a pipe moving along said axis in coincidental alignment therewith;
   first and second pipe-centralizing rollers movably arranged on opposite sides of said conveyor means for movement laterally in relation to said axis;
   means cooperatively intercoupling said rollers to one another for travel in unison and in opposite directions for alternately moving said rollers together and apart in response to corresponding movements of at least one of said rollers;
   piston-actuating means cooperatively arranged for moving said rollers in unison and including a relatively-movable piston cylinder and piston defining separated fluid chambers in said piston cylinder on opposite sides of said piston; and
   control means operable upon pressure changes in one of said fluid chambers resulting from relative movement in one direction of said piston cylinder and piston in response to separation of said rollers by engagement of a misaligned pipe moving along said conveyor means with one of said rollers for selectively changing the pressure in the other of said fluid chambers to relatively move said piston cylinder and piston in the opposite direction for bringing said rollers together with sufficient force to realign the misaligned pipe with said axis.

6. The apparatus of claim 5 further including:
   means selectively operable for regulating the fluid pressure in said one fluid chamber to normally position said rollers at selected spacings.

7. The apparatus of claim 5 wherein said control means include:
   valve means coupled to said other fluid chamber and adapted for selectively supplying a pressured fluid thereto; and
   valve-actuating means coupled to said one fluid chamber and adapted for operating said valve means in response to a predetermined pressure change in said one fluid chamber.

8. The apparatus of claim 5 wherein said control means include:
   valve means coupled to said other fluid chamber and adapted for selective movement between a normal operating position to supply a pressured fluid of one selected pressure to said other fluid chamber and another operating position to supply a pressured fluid of a higher selected pressure to said other fluid chamber; and
   valve-actuating means coupled to said one fluid chamber and adapted for moving said valve means from said normal operating position to said other operating position in response to a predetermined pressure change in said one fluid chamber.

9. The apparatus of claim 8 further including:
   means selectively operable for regulating the fluid pressure in said one fluid chamber to normally position said rollers at selected spacings.

10. The apparatus of claim 5 wherein said rollers are disposed horizontally above and below said conveyor means and said intercoupling means include:
    at least one pair of sprocket wheels above and below said rollers and respectively journalled for rotation in a common vertical plane to one side of said axis, at least one endless drive chain cooperatively arranged on said sprocket wheels for vertical movement back and forth thereon, means cooperatively coupling said first roller to one half of said drive chain for carrying said first roller in the direction of movement of said one half of said drive chain, and means cooperatively coupling said second roller to the other half of said drive chain for carrying said second roller in the direction of movement of said other half of said drive chain.

11. The apparatus of claim 10 wherein said control means include:
a first source of pressured fluid of a selected first pressure;
a second source of pressured fluid of a selected second pressure greater than said first pressure;
valve means coupled between said other fluid chamber and said first and second sources of pressured fluids and cooperatively arranged for selective movement between a normal operating position communicating said first source with said other fluid chamber and another operating position communicating said second source with said other fluid chamber; and
valve-actuating means coupled to said one fluid chamber and adapted for moving said valve means from said normal operating position to said other operating position in response to a predetermined pressure change in said one fluid chamber.

12. The apparatus of claim 11 further including:
means selectively operable for regulating the fluid pressure in said one fluid chamber to normally position said rollers at selected spacings above and below said axis.

* * * * *